United States Patent [19]
Anderson

[11] Patent Number: 5,365,328
[45] Date of Patent: Nov. 15, 1994

[54] LOCATING THE POSITION OF AN EVENT IN ACQUIRED DIGITAL DATA AT SUB-SAMPLE SPACING

[75] Inventor: Duwayne R. Anderson, Redmond, Oreg.

[73] Assignee: Tektronix, Inc., Wilsonville, Oreg.

[21] Appl. No.: 65,724

[22] Filed: May 21, 1993

[51] Int. Cl.⁵ ............................................. G01N 21/88
[52] U.S. Cl. .................................................... 356/73.1
[58] Field of Search ......................................... 356/73.1

[56] References Cited

U.S. PATENT DOCUMENTS

| | | | |
|---|---|---|---|
| 4,898,463 | 2/1990 | Sakamoto et al. | 356/73.1 |
| 5,069,544 | 12/1991 | Buerli | 356/73.1 |
| 5,155,439 | 10/1992 | Holmbo et al. | 324/534 |

FOREIGN PATENT DOCUMENTS 60-253836  12/1985  Japan ................................. 356/73.1

*Primary Examiner*—Vincent P. McGraw
*Attorney, Agent, or Firm*—William K. Bucher

[57] ABSTRACT

A method for characterizing an event in acquired digital data is described where the event has a known shape and a pattern having amplitude and location coefficients is applied to the data for determining a best fit between the data and the pattern as a function of a peak RMS value. The derived RMS value is compared to a threshold value for verifying the existence of the event. The event is characterized as to amplitude and location using the amplitude and location coefficients of the pattern. Such a method is useful in characterizing non-reflective events in acquired optical time domain reflectometry data.

7 Claims, 5 Drawing Sheets

LOCATING THE POSITION OF AN EVENT IN ACQUIRED DIGITAL DATA AT SUB-SAMPLE SPACING

BACKGROUND OF THE INVENTION

The present invention relates to characterizing events in acquired digital data and more specifically a method for accurately determining the location and loss of the non-reflective events in optical time domain reflectometry data.

In telecommunications and network applications, transmitters and receivers are connected together via signal transmission cables, such as coaxial cables or optical fibers. Faults in these cables often result in undesired attenuation of signals transmitted over the cables resulting in lost information. Time domain reflectometers are used to test these cables to determine if they have irregularities, such as faults or other discontinuities, that would interfere with the transmission of information.

Optical time domain reflectometry is similar to radar. Pulses are transmitted into the medium and during the interval between pulses the return signal is examined for non-fiber events, i.e. reflective and non-reflective events. When light propagates through an optical fiber, the fiber material scatters the light in a process known as "Rayleigh scattering". Some of the light is scattered back through the fiber to the transmitter. This light is referred to as "backscatter". The backscatter signal from a pulse launched into an optical fiber decreases exponentially with distance along the fiber. A non-reflective event in the fiber, where light is lost but no light is reflected, appears in the backscatter signal as an anomalous drop over a pulse width. Locating non-reflective events is of interest when determining fiber quality and fault location. From the known index of refraction of the fiber and a plot of return signal-versus-time, the location of a non-reflective event in question can be determined relative to a known event such as the beginning of the fiber or a nearby connector or splice.

A non-reflective event has a characteristic Z-shaped pattern in the acquired signal-versus-time backscatter data. The start of the anomalous drop in the backscatter is considered the location of the non-reflective event. However, locating the start of the anomalous drop is difficult when the non-reflective event is located in noisy data. This system noise tends to obscure the true backscatter return signal. Averaging of each data point of the acquired OTDR data is required to reduce the noise in the backscatter return signal. Various methods have been used to both reduce the noise in the backscatter signal and to locate the start of the non-reflective event.

One method of determining the location of a non-reflective event is to use a two-point method. If a second data point is lower than the previous data point and the difference in the amplitude values of the data points is greater than a threshold value, then a non-reflective event is indicated. This method can be used with a waveform of collected data or in a running point by point acquisition. One drawback to this method is that extensive averaging of the data is required in order to reduce the noise as much as possible. This substantially increases the acquisition time of the OTDR and thus the time it takes to characterize the fiber and locate any faults in the fiber. Reducing the number of averages increases the likelihood that non-events will be detected as non-reflective events. To overcome this problem, the detection threshold has to be increased thus reducing the non-reflective resolution of the OTDR.

Many prior techniques for determining the location of non-reflective events have used the results of a relative rate of loss determination. The relative rate of loss determination is essentially differentiating the acquired waveform from point-to-point over a pulse width of data. Since the sample spacing for the acquired data is constant, an approximation for the differentiation is a filter that sums data values prior to the differentiation point and subtracts the sums of data points after the value. Over a region of data containing a non-reflective event, the differentiation produces a maxima representing the approximate location of the non-reflective event.

U.S. Pat. No. 5,115,439 to Holmbo et al. describes a method for detecting and characterizing anomalies in an optical fiber under test where increased averaging is used over a decreasing region containing a non-reflective event. The approximate location of the non-reflective event is detected using the previously described two-point method and a minimum number of samples for each data point. Once an approximate location is found, the region containing the event is sampled again and the relative rate of loss over the event is determined and used as the approximate location of the event. The loss over the event is also determined and compared with empirically derived loss values. The region containing the event is decreased as a function of the loss and additional samples are taken over the reduced region and added to the previous samples to reduce noise. The process of determining the relative rate of loss, reducing the region containing the event and additional averaging continues through a predetermined number of iteration. The result is a location for the event with a reduced region of uncertainty for its location.

U.S. Pat. No. 5,069,544 to Buerli describes a matched filter for determining the approximate location of events with loss. The filter function $f_{mf}$ is created according to the equation:

$$f_{mf} = (p_1 + p_2) - (s_1 + s_2)$$

where $p_1$ and $p_2$ are the values of the two preceding data points and $s_1$ and $s_2$ are the values of the two succeeding data points. The matched filter function generates a peak whose location is the approximate location of the fault and whose baseline height is proportional to the loss of the fault.

U.S. Pat. No. 4,898,463 to Sakamoto et al. describes an optical time domain reflectometer with an automatic measuring function of optical fiber defects. A level computing section sequentially performs differentiation of the acquired waveform data to provide a predetermined number of level difference data between two points of an interval "a". The interval "a" between two points of data being subjected to differentiation is determined on the basis of the pulse width "b" of Fresnel reflection light detected by a light receiving section and is set slightly greater than this pulse width "b". The differentiated values of the acquired data are constant where there is no fiber event. A change in the differentiated values is used as a reference point X1 for the event and the value "a" is added to the X1 value to determine the location of the event.

Currently, prior art methods for locating non-reflective events are approximations of the event location. Accurately locating a non-reflective event depends on the amount of noise in the acquired data and the sample spacing of the data. At the present time, the most accurate non-reflective event location is no better than plus or minus one-half the sample spacing. Adding noise to the acquired data decreases the accuracy even further. What is needed is a method for locating a non-reflective event in acquired data from a fiber under test that is substantially more accurate than the present two point method or differentiating the acquired data. Such a method should not require additional sampling to improve results by reduce noise nor should it require reduced sample spacing. Such a method should be able to locate a non-reflective event to an accuracy greater than the sample spacing of the acquired data.

SUMMARY OF THE INVENTION

Accordingly the present invention is a method of characterizing an event in a waveform of acquired digital data where the event has a known shape. A pattern having amplitude and location coefficients is applied to the digital data for determining a best fit between the data and the pattern as a function of a peak RMS value. The peak RMS value is compared to a threshold value for verifying the existence of the event. The event is characterized as to amplitude and location using the amplitude and location coefficients of the pattern.

Such a method is usable in an optical time domain reflectometer, OTDR, for characterizing non-reflective events. Non-reflective events in acquired OTDR digital data have a known shape and a pattern representing this shape having amplitude and location coefficients is applied to the digital data for determining a best fit between the pattern and the data as a function of a peak RMS value. In positioning the pattern over the data it is preferred that the location coefficient increment be less than the sample spacing of the acquired digital data. The peak RMS value is compared to a threshold value as determined by the local noise of the non-reflective event data for verifying the existence of the event. The non-reflective event is characterized as to loss using the amplitude coefficient and the location is characterized by the location coefficient. When an approximate pattern for the event is used, an additional correction value is applied to the location coefficient as a function of the amplitude coefficient and the pulse width of launched optical pulses from the OTDR into the fiber under test. The objects, advantages and novel features of the present invention are apparent from the following detailed description when read in conjunction with appended claims and attached drawings.

DESCRIPTION OF THE PREFERRED EMBODIMENT

Noise is an ubiquitous problem in acquired digital data. Any attempt to analyze digital data must take into account the effects of noise in the data. The present invention is a method of characterizing an event in acquired digital data that effectively reduces the noise in the digital data without having to substantially increase the signal averaging of the data. In addition, the present invention is able to locate an event in the digital data with a grater accuracy than the sample spacing of the data.

The method includes finding the best fit of a pattern to the acquired digital data. The pattern may be an exact or an approximate representation of the event, which has a known shape. The pattern is represented by a expression having amplitude and location coefficients. The pattern is applied to the data using an iterative process where one coefficient is incremented one value at a time while the other coefficient is incremented through a series of values. The pattern and data are evaluated according to the expression:

$$S^2 = \Sigma(Pat_i - y_i)^2$$

where S is the root mean squared (RMS) error between the waveform and the pattern, $Pat_i$ is the value of the pattern expression at the data point, and $Y_i$ is the value of the data point. Evaluating each location coefficient point of the pattern expression using the RMS expression effectively reduces the noise in the data. The best fit between the pattern and the data produces an peak RMS value. The location and amplitude coefficients for the peak RMS value provide an accurate location and amplitude of the event.

Even though the application and evaluation of the pattern to the digital data effectively reduces the noise in the data, the peak RMS value needs to be compared to a threshold value for verifying the existence of the event. The threshold value for comparison is based on the statistics of the local variance of the noise in the region containing the event. Those having ordinary skill in digital signal processing art are familiar with the various ways of calculating the standard diviation of noise in a digital signal. The important concept here is that the threshold is set as a function of the local standard diviation of the noise and not some preset arbitrary value as is known in the art.

Figure 1:
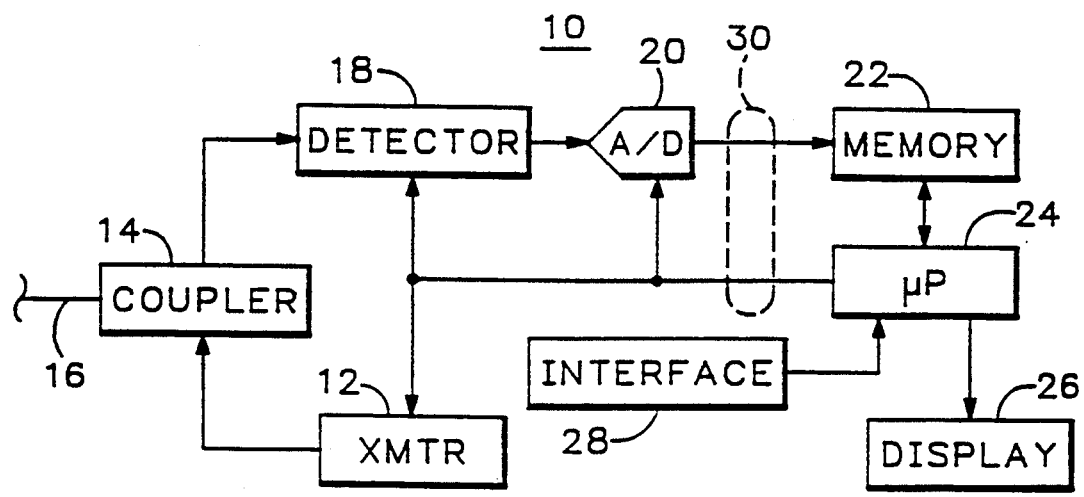
FIG. 1 is a block diagram of an optical time domain reflectometer that uses the event characterization method according to the present invention.
Figure 2A:
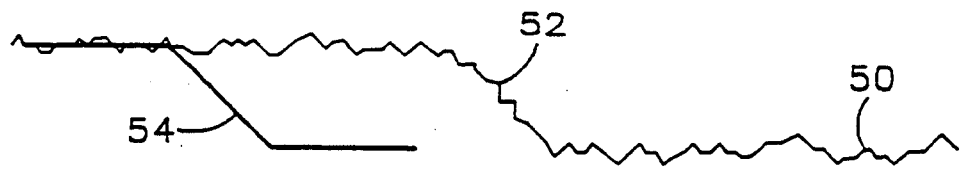
FIGS. 2A-2E are representations of a non-reflective event Z-pattern being fit to the non-reflective event according to the present invention.
Figure 2B:
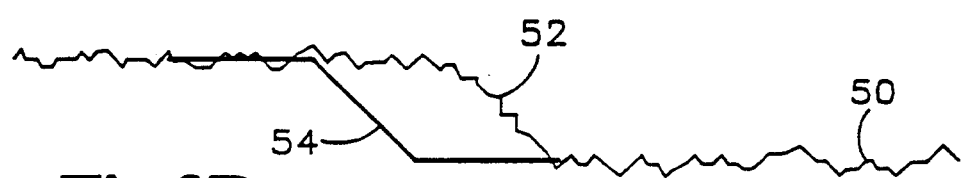
Figure 2C:
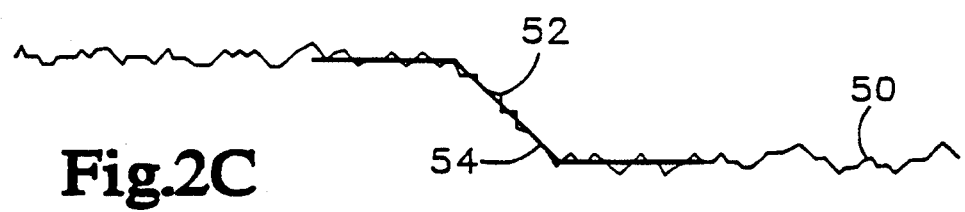
Figure 2D:
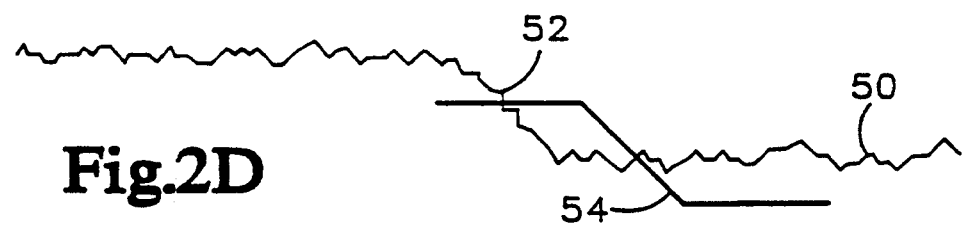
Figure 2E:
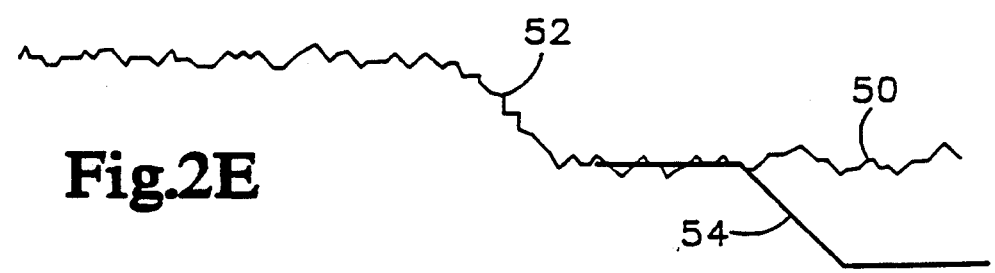

A particular embodiment of the above described method is used for locating non-reflective events in optical time domain reflectometry (OTDR) data. Referring to FIG. 1, an OTDR 10 is shown having an optical transmitter 12 that transmits a light pulse via a coupler 14 into an optical fiber 16. The Rayleigh backscattered return signal from the optical fiber 16 is passed by the coupler 14 to a detector 18, the output of which is sampled by an analog-to-digital converter 20 and stored in a suitable memory device 22, which may include both volatile and non-volatile memory. A microprocessor 24 controls the pulse repetition frequency and pulse width of the transmitted light pulse as well as the sample start time, data duration and sample rate for the received signal. The microprocessor 24 then processes the received digital data stored in the memory device 22 to generate a display on a suitable display device 26 that includes both an analog display and an alphanumeric display, the information displayed and the various operating parameters being determined by an operator from a control interface 28. The microprocessor 24 may be an integral part of the OTDR 10, or may be a separate device that communicates with the OTDR over a suitable interface bus 30.

Referring to FIGS. 2A–2E, there is shown a portion of an acquired OTDR waveform 50 having a non-reflective event 52. Generally, OTDR waveform data 50 is acquired and stored in memory 22. Additional processing is then performed for evaluation of the waveform and displaying the data. The present invention is applied to the stored waveform data 50 but the invention may be applied to OTDR data as it is acquired. The present invention is implemented after the approximate location of the event 52 is found. There are various way of for locating the approximate location of the event 52. One way is to generate a sliding slope over a pulse width and determine changes in the slope that are greater than a threshold, which is based on the local noise. Any location in the data 50 that exceeds the threshold is considered a non-fiber event. Further processing determines whether the event is a reflective event or a non-reflective event. Once the approximate location for a non-reflective event 52 is found, the present invention is used to accurately locate the event 52 and determine its loss.

As can be seen in FIGS. 2A–2E, a non-reflective event 52 has a particular shape. Knowing this information and the set-up of the OTDR, such as the pulse width and the like, a pattern 54 can be matched to the data 50 to determine the event location and loss. An mathematical expression representing the pattern can be derived that exactly matches the non-linear shape of the non-reflective event and can be applied to the waveform data. However, such an expression is numerically intensive and would slow the evaluation process of the OTDR. Alternately, linear line fit expression representing the pattern 54 can be used which closely approximates the non-reflective event 52. The linear line fit expression contains coefficients related to the location and the loss of the event. Applying the linear line fit expression to the data and determining the peak RMS value for the fit gives the accurate location and loss of the event 52.

In finding the best fit for the pattern 54, the loss and location coefficients are incremented over a range of values. Since the approximate location of the event 52 is known, the range of values for the location coefficient can be set, for example, for one-half a pulse width before and after the approximate location event 52. The amplitude coefficient representing the loss is set as a function of the slope of the non-reflective event 52 and the uncertainty of the slope measurement due to noise. The approximate loss of the event 52 is determined as a function of the slope times the pulse width and the uncertainty in the loss is a function of the standard deviation of the slope times the pulse width. From these calculations, a lower limit starting point is set for the loss coefficient.

Figure 3:
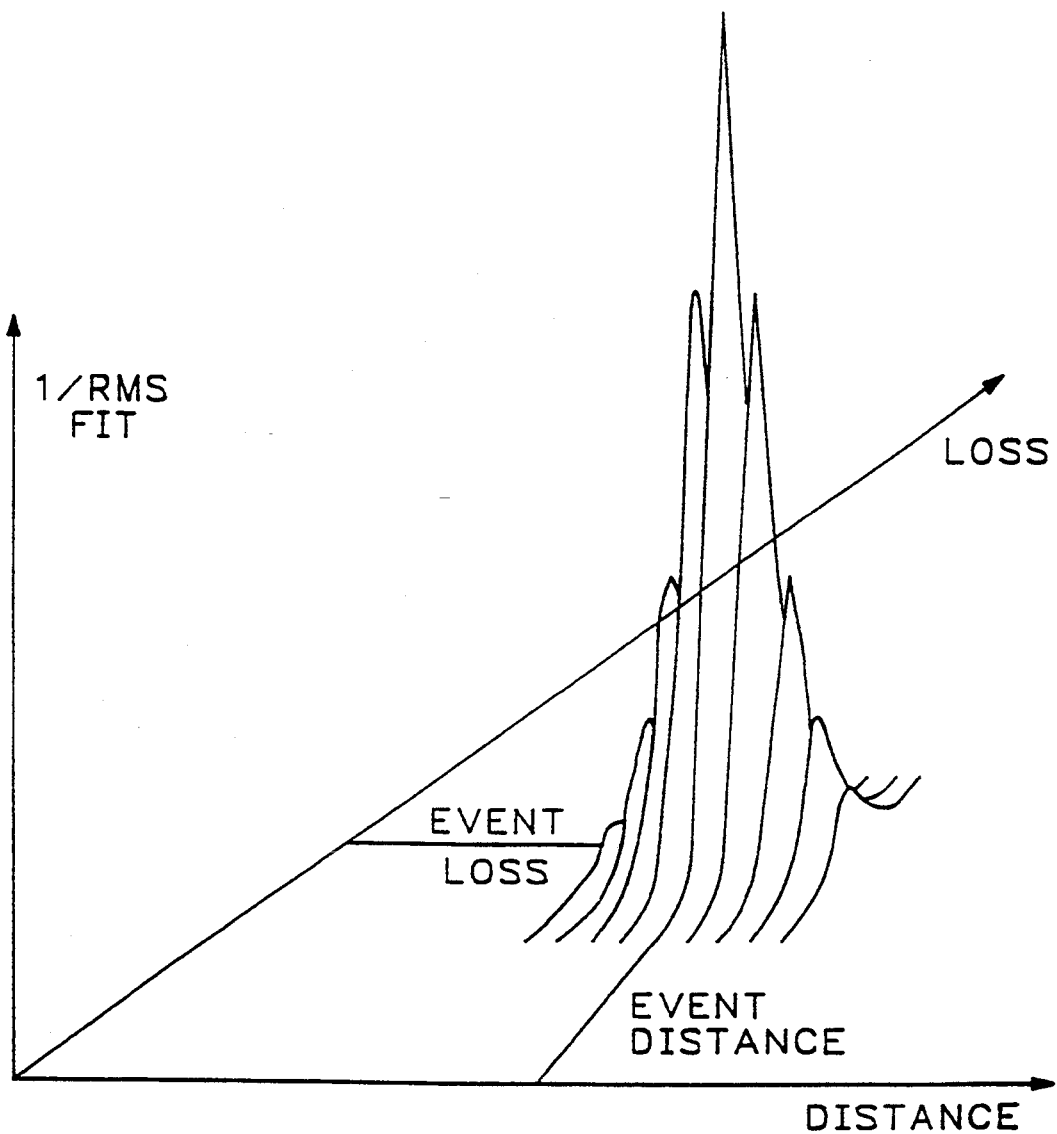
FIG. 3 is a plot of 1/RMS values for pattern distance and loss coefficients according to the present invention.

Applying the pattern 54 to the data is performed by setting the loss coefficient to a first value and incrementing the location coefficient over a range of values. One way of doing this is to use a binary search whose implementation is well known in the art and need not be discussed further. An import feature of the present invention is that the location coefficient can be less than the sample spacing of the acquired digital waveform data 50. This allows location accuracy greater than the sample spacing of the data 50, which had not been possible before now. FIGS. 2A–2E are representations of the non-reflective event pattern 54 being fit to the non-reflective event 52 with a loss coefficient that matches the loss of the event. FIG. 3 show the results of the pattern fit process to the non-reflective event 52. FIG. 3 is a plot of the 1/RMS value as a function of the pattern location and loss coefficients. For purposes of presenting the results of the pattern fit in a more readable form, 1/RMS is plotted to generate a positive peak whereas plotting the RMS result produces a negative peak. As can be seen in the plot, a peak value is obtained corresponding to a particular set of location and loss coefficients. These coefficients are used to characterize the location and loss of the non-reflective event 52.

Figure 4:
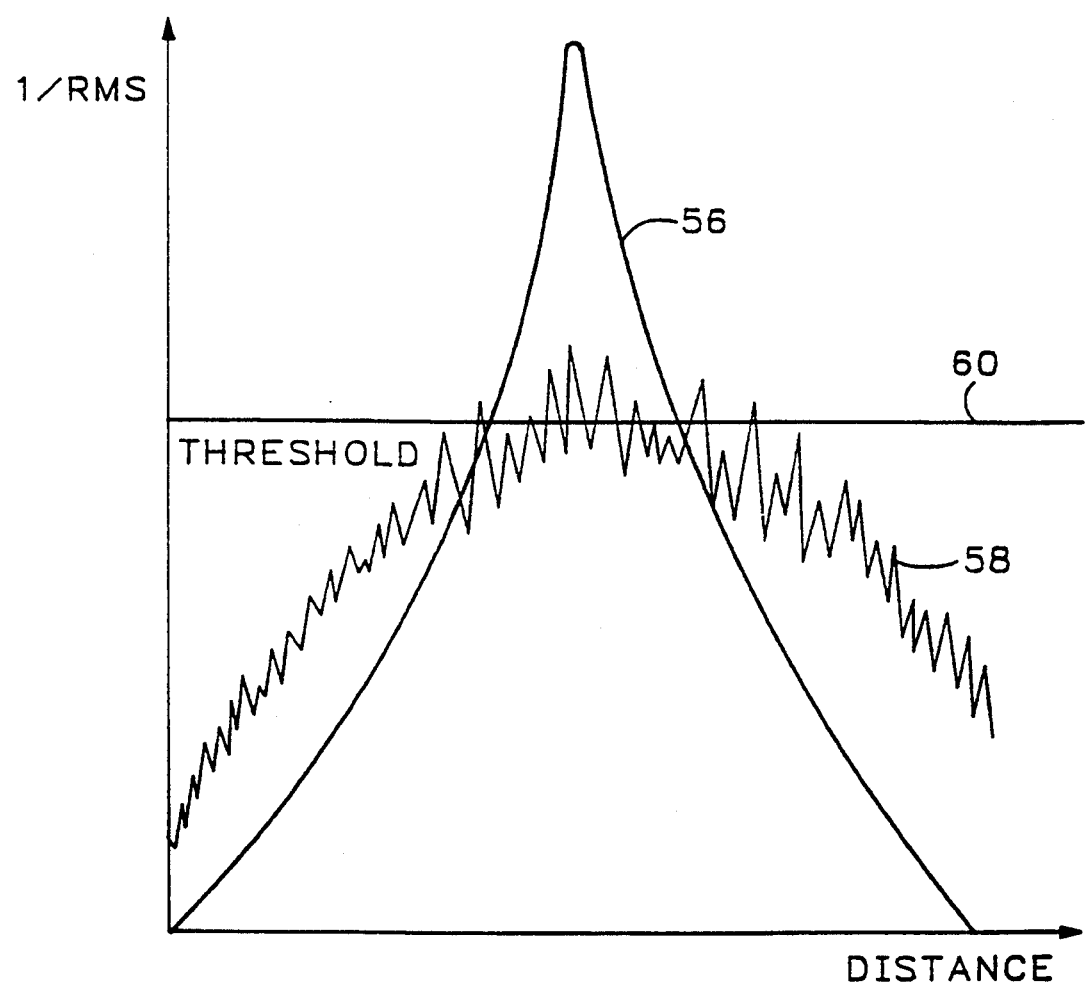
FIG. 4 is a plot of 1/RMS values versus distance coefficient values for noisy data OTDR data according to the present invention.
Figure 5A:
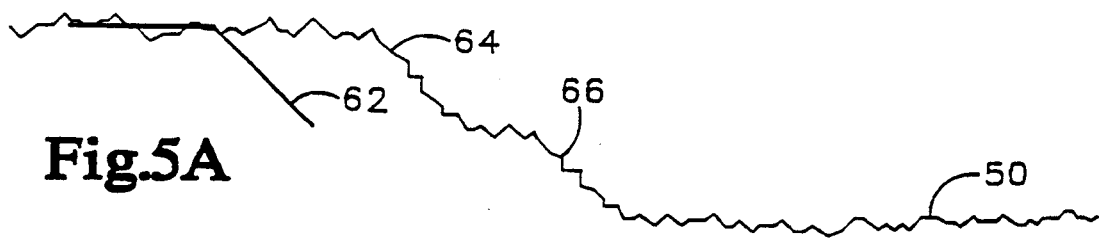
FIGS. 5A-5F are representations of a corner-fit pattern being fit to a multiple non-reflective event according to the present invention.
Figure 5B:
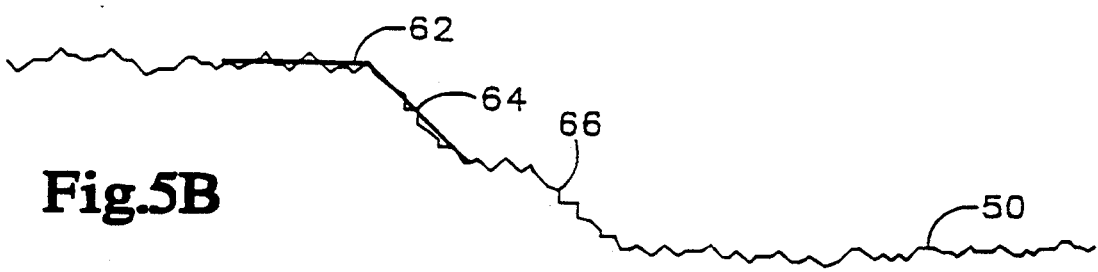
Figure 5C:
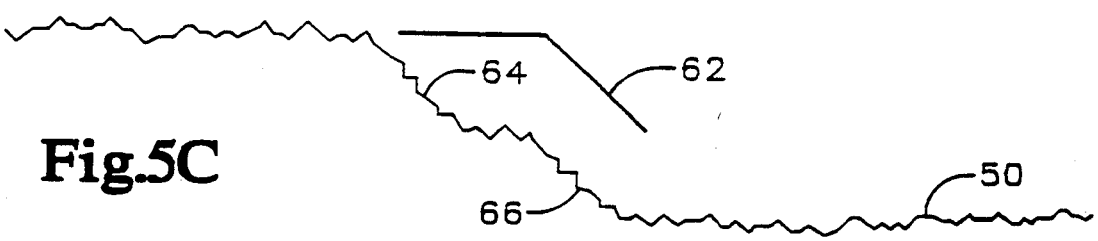
Figure 5D:
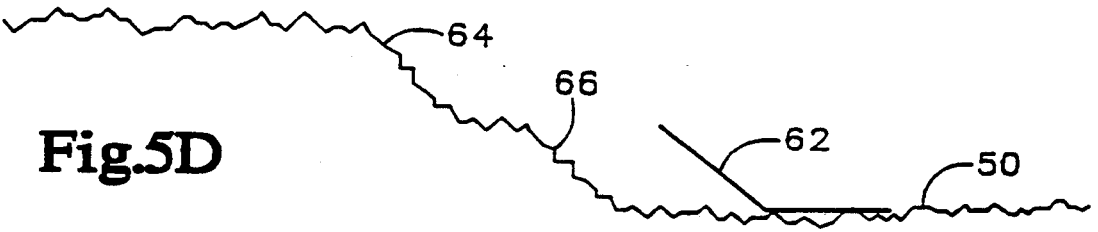
Figure 5E:
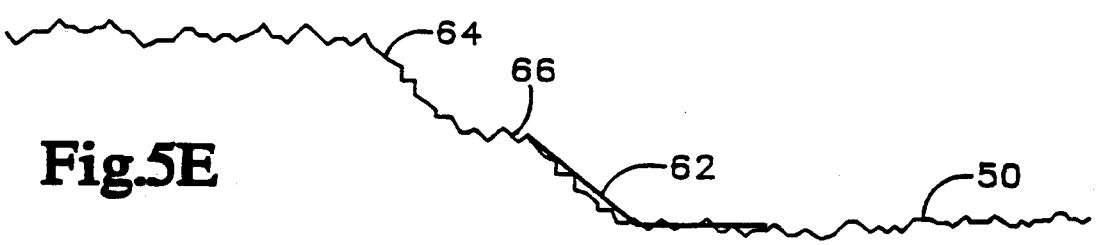
Figure 5F:
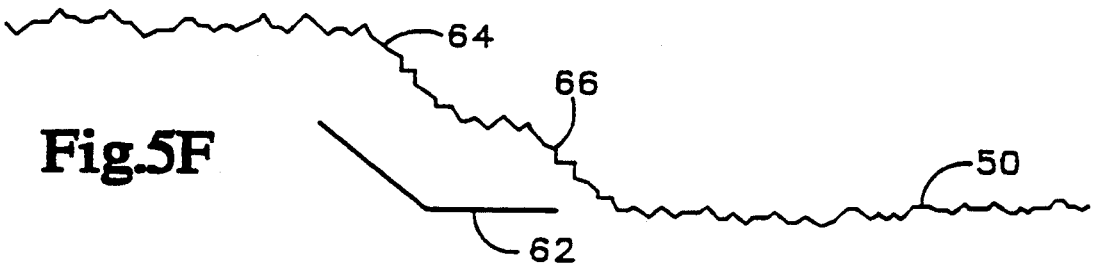

As was described in the generalized form of the invention, the peak RMS value is compared to a threshold value to verify the existence of the event. FIG. 4 shows a two dimensional representation of both a clean and noisy 1/RMS plot with distance on the x-axis and the 1/RMS value on the y-axis. It would be trivial to determine if an event existed in non-noisy data as shown by the plot 56. In a plot 58 having a large noise component it is sometimes difficult to determine if it is a real event. The present invention uses the statistics of the local variance of the noise in the region containing the event to set a threshold value 60. Based on the derived threshold value 60 there is a ninety-five percent probability that the event is a real event. Existing OTDR's set an arbitrary threshold value for detecting an event based on a preselected user value or some average noise value for the total fiber and test instrument.

As was previously described, the non-reflective event pattern 54 that is used in the preferred embodiment is an approximation of a real non-reflective event. The Z-fit pattern 54 is composed of three linear segments with the beginning segment being a linear regression of the waveform data points over the segment. The second segment, which is the loss region, models the non-reflective event of some assumed loss, and is one pulse width long. The third segment is a linear regression of waveform data points over some length after the end of the loss region. Since the pattern 54 is an approximation, it is desirable to apply a correction value to the location coefficient to more accurately locate the event 52. One way of generating the correction value is to derive a distance correction formula as a function of the loss and pulse width, since the distance error is a function of the loss of the event and the pulse width. Once the event is located with the pattern fit 54, the correction value is derived and applied to the location coefficient. The drawback to this method is that it more numerically intensive and therefore required more time to determine the location of the non-reflective event 52. A faster alternative is to derive a pulse width versus loss table from empirically derived data and store the data in the OTDR memory 22. Since the pulse width of the launched optical pulses for the fiber examination is known, the distance correction value for the event 52 can be determined once the loss coefficient of the peak RMS value for the pattern-data fit is obtained. If the incremental values of the loss coefficient are less than the loss values in the table, interpolation may be used to provide a more accurate location correction value.

The Z-fit pattern 54 works well with single non-reflective events 52. However, closely spaced non-reflective events require an alternative pattern. Such a pattern 62 is shown in FIGS. 5A–5F associated with two closely spaced non-reflective events 64 and 66. The new pattern 62, called a corner-fit pattern is two-thirds of a Z-fit pattern 54 and is applied to the waveform data 50 from both directions. Since a non-reflective event can not be greater than one pulse width, any non-reflective event that is greater than one pulse width is considered as having multiple events. The corner-fit pattern 62 is applied to the multiple non-reflective event 64 and 66 in a manner similar to the Z-fit pattern 54 with the exception that it is applied from both directions. The best fit for the patterns 62 from both directions produces peak RMS values that characterize the individual events 64 and 66 for distance and loss.

A method has been described for characterizing an event in acquired digital data, such as a non-reflective event in OTDR data, where the event shape is known. A pattern having amplitude and location coefficients is applied to the data for determining the best fit between the data and the pattern as a function of a peak RMS value. In the application process the amplitude and location coefficients are incremented over a range of values to find the best pattern fit. The peak RMS value is compared to a threshold value for verifying the existence of the event, and if the event is valid the event is characterized for distance and amplitude using the location and amplitude coefficients. The method is usable on both uniformly and non-uniformly spaced data samples. These and other aspects of the present invention are set forth in the appended claims.

What is claimed is:

1. A method for characterizing an event in a waveform of acquired digital data where the event has a known shape comprising the steps of:
   (a) applying a pattern having amplitude and location coefficients over the acquired digital data for determining a best fit between the data and the pattern as a function of a peak RMS value by incrementing the amplitude coefficient of a pattern and positioning the pattern over the acquired data for each amplitude coefficient for determining the RMS value as a function of varying the location coefficient with the location coefficient increment spacing being less than the sample spacing of the digital data;
   (b) comparing the peak RMS value to a threshold value for verifying the existence of the event; and
   (c) characterizing the event as to amplitude and location using the amplitude and location coefficients of the pattern.

2. The method as recited in claim 1 wherein the comparing step further comprises the step of evaluating the threshold value as a function of the local noise at the event.

3. A method of characterizing a non-reflective event in a waveform of acquired optical time domain reflectometer digital data from a fiber under test where the non-reflective event has a known shape comprising the steps of:
   (a) applying a pattern having amplitude and location coefficients over the acquired digital data for determining a best fit between the data and the pattern as a function of a peak RMS value by incrementing the amplitude coefficient of a pattern and positioning the pattern over the acquired data for each amplitude coefficient for determining the RMS value as a function of varying the location coefficient with the location coefficient increment spacing being less than the sample spacing of the digital data;
   (b) comparing the peak RMS value to a threshold value for verifying the existence of the event; and
   (c) characterizing the non-reflective event as to loss and location on the fiber using the amplitude and location coefficients of the pattern.

4. The method as recited in claim 3 wherein the applying step further comprises the step of determining an approximate location for the non-reflective event in the acquired digital data.

5. The method as recited in claim 3 wherein the comparing step further comprises the step of evaluating the threshold value as a function of the local noise at the event.

6. The method as recited in claim 4 wherein the acquired digital data is a function of optical pulses having a predetermined pulse width being launched into the fiber under test and a return optical sign from the fiber is converted to an electrical signal, sampled and stored in the optical time domain reflectometer and wherein the characterizing step further comprises applying a correction value to the location coefficient of the pattern as a function of the amplitude coefficient and the pulse width of the launched optical pulses.

7. A method of characterizing a non-reflective event in acquired optical time domain reflectometry digital data from a fiber under test wherein the non-reflective event has a known shape and optical pulses having a predetermined pulse width are launched into the fiber and a return optical signal from the fiber is converted to an electrical signal, sampled and stored in the optical time domain reflectometer, the steps comprising:
   (a) determining an approximate location for the non-reflective event in the acquired digital data;
   (b) applying a pattern having amplitude and location coefficients over the acquired digital data for determining a best fit between the data and the pattern as a function of a peak RMS value by incrementing the amplitude coefficient of a pattern and positioning the pattern over the acquired data for each amplitude coefficient for determining the RMS value as a function of varying the location coefficient with the location coefficient increment spacing being less than the sample spacing of the digital data;
   (c) comparing the peak RMS value to a threshold value for verifying the existence of the event with the threshold value being evaluated as a function of the local noise at the event;
   (d) characterizing the non-reflective event as to loss and location on the fiber using the amplitude and location coefficients of the pattern; and
   (e) applying a correction value to the location coefficient of the pattern as a function of the amplitude coefficient and the pulse width of the launched optical pulses.

* * * * *